3,383,407
MEDICINES ACTING AS NERVE
REGULATORS
Joseph Nordmann, Paris, and Henri Blaise Swierkot,
Bondy, France, assignors to Etablissements Kuhlmann,
Paris, France
No Drawing. Filed Apr. 22, 1964, Ser. No. 361,878
Claims priority, application France, Apr. 26, 1963,
932,811
3 Claims. (Cl. 260—500.5)

The present invention relates to new medicines with sedative and tonic properties.

It has been found that 3,4,5-trimetoxybenzohydroxamic acid and its salts have sedative and tonic properties. Of particular interest are the salts or combinations of this acid with monoethanolamine or its derivatives methylated on the nitrogen atom in the molecular proportion of 2 moles of acid for 1 mole of base. These compounds can be represented by the following formula:

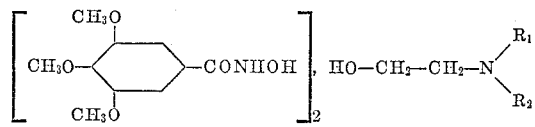

in which $R_1$ and $R_2$ represent hydrogen atoms or $CH_3$ groups. They may be given, for example, in the form of cachets or tablets containing 250 or 500 mgs. The monoethanolamine derivative, in $R_1$ and $R_2$ both represent a hydrogen atom, is, in particular, a colourless product with a recrystallized melting point of 140–142° C. in a capillary tube. It can be identified by its melting point, its conversion into 3,4,5-trimethoxybenzohydroxamic acid of melting point 178–180° C. on a Maquenne block and its nitrogen content.

According to one embodiment of this invention the monoethanolamine salt, chosen by way of example, may be prepared in the following way: 58.4 parts of hydroxylamine hydrochloride are dissolved in a solution of 67 parts of caustic soda tablets in 420 parts of distilled water. A solution of 95 parts of methyl 3,4,5-trimethoxybenzoate (C. J. Overmeyer, J. Am. Chem. Soc., 1927, 49, 503) in 400 parts by volume of methanol is then slowly added. The temperature of the reaction mixture rises from 20° C. to 28–29° C. The whole is stirred and cooled and kept for some minutes at 28° C. The sodium salt of 3,4,5-trimethoxy-benzohydroxamic acid is precipitated on the introduction of the ester, and at the end of some minutes it forms a crystalline mass. The precipitate is filtered off and dissolved in 1950 parts of water at 30–33° C. After cooling to 23–24° C. the solution is acidified by the addition of glacial acetic acid until a pH of 4 is reached, without exceeding a temperature of 25–26° C. It is left to crystallize and the crystals are filtered off, washed with water, dried and 74 parts (77% of theory) of 3,4,5-trimethoxy-benzohydroxamic acid are obtained. By dissolving in hot methanol, then adding isopropyl ether, a pure product is obtained with a yield on recrystallization of 77% to 80%. It can also be recrystallized from water.

3,4,5 - trimethoxy-benzohydroxamic acid is a white crystalline material, melting at 178–180° C. on a Maquenne block and at 170° C. in a capillary tube, and with a solubility in water at 20° C. of about 3.1%

Analysis provides the following results. Calculated for $C_{10}H_{13}O_5N$: C, 52.86%; H, 5.76%; N,6.16%. Found C, 52.97%; H, 6.07%; N, 6.66%.

241 parts of 3,4,5-trimethoxy-benzohydroxamic acid are dissolved in 1550 parts by volume of methanol at about 60° C. While cooling, 35.5 parts of monoethanolamine are introduced. A precipitate appears some minutes after the end of the addition of the reagents, and this is allowed to stand for 15 minutes, filtered off, washed with a little cold methanol and dried. After drying in an oven at 70° C., 240 parts of a white substance are obtained, with a melting point in a capillary tube of 138–139° C. and a melting point on a Maquenne block of 157° C.

It can be recrystallized by dissolving in methanol with a small addition of isopropyl ether; for example, 64 parts of the product are dissolved in 400 parts by volume of methanol with the addition of 60 parts by volume of isopropyl ether. 53.8 parts of product with a melting point of 140–142° C. in a capillary tube are obtained.

Analysis.—Calculated for $C_{22}H_{33}N_3O_{11}$: C, 51.26%; H, 6.45%; N, 8.15%. Found: C, 51.42; H, 6.38; N, 8.10.

In a similar manner N-methylaminoethanol 3,4,5-trimethoxyhydroxamate of the empirical formula:

$$C_{23}H_{35}N_3O_{11}$$

is prepared of melting point on a Maquenne block of 139° C. to 140° C. and on a Culatti block of 130° C.

Pharamacological properties.

The toxicological characteristics of 3,4,5-trimethoxybenzohydroxamic acid are as follows:

When it is administered orally in suspension in water containing gum arabic to the C57 Black mouse the lethal dose 50 is 1.90 g./kg. the lethal dose 100 is 3 g./kg. and the maximum non-toxic dose is 1.00 g./kg., the observations being made in 72 hours. When administered intraperitoneally and on the same species, the lethal dose 50 is 1.31 g./kg., the lethal dose 100 is 2.00 g./kg. and the maximum non-toxic dose is 0.75 g./kg.

It has a certain number of pharmacological properties which affect the central nervous system and which can be demonstrated by a series of observations.

With a dose of 0.8 g./kg. administered intraperitoneally to the mouse, the central temperature falls, in two hours, for example, from 37.5° C. to 29.3° C. and it returns progressively to the normal temperature.

On taking as the test the reaction of the mouse to a hot plate and on administering to females of the C57 Black stock weighing 17 to 20 g. an oral dose of 0.75 g./kg. the mean time of the escape reaction of the animal rises, comparatively to control experiments, to 178% an hour after the administration and is still the same two hours after the administration.

It is slightly sedative in the spinning rod test where a dose of 0.56 g./kg. administered intraperitoneally to C57 black mice modifies the reaction of the animal for some hours.

The toxicological characteristics of monoethanolamine 3,4,5- trimethoxybenzohydroxamate are as follows:

When it is administered orally in suspension in water containing gum arabic to the C57 Black mouse the lethal dose 50 is 2.25 g./kg., the lethal dose 100 is 3 g./kg. and the maximum non-toxic dose is 0.80 g./kg., the observations being made in 72 hours. When administered intraperitoneally and on the same species, the lethal dose 50 is 1.13 g./kg., the lethal dose 100 is 1.7 g./kg. and the maximum non-toxic dose is 0.8 g./kg., the observations having been prolonged over 48 hours. This product then has relatively little toxicity.

It has a certain number of pharmacological properties which affect the central nervous system and which can be demonstrated by a series of observations.

With a dose of 0.8 g./kg. administered intraperitoneally to the mouse, the central temperature falls by 10° C. in three hours, passing, for example, from 37° C. to 27° C. and it returns progressively to the normal temperature after 24 hours, but is still at 31° C. after 8 hours. This remarkable action on the thermo-regulator centre is also confirmed by a depressive action on the diencephalic centres of pain, which action does not moreover affect the cortical layer as other tests show.

On taking as the test the reaction of the mouse to a hot plate and on administering to females of the C57 Black stock weighing 17 to 20 g. an intraperitoneal dose of 0.6 g./kg. the mean time of the escape reaction of the animal, which is 4.9 seconds with control experiments, rises to 24.5 seconds an hour after the injection and to 27.3 seconds 2 hours after. It is still 17.1 seconds after 3 hours and 8.5 seconds after 6 hours. The percentage of peripheral anaesthesia reaches 552 after 2 hours, which testifies to the value of the action of this compound.

These results show that this substance has a depressive action on the hypothalamic centre of thermo-regulation and on the diencephalic centres. However, like many analgesic-antipyretic compounds, it does not cause any elevation of the threshold of response to painful stimulations under the conditions of the test methods; for example, it does not modify the reaction to tail pinching. There is therefore characterisation of a central depressiveness and its reflexes intact, as well as revealing the negative nature of the test for the Preyer reflex and hypnotic tests such as the posture reflex and the sleep reflex.

Monoethanolamine 3,4,5-trimethoxy-benzohydroxamate has a slight sedative action on the behaviour of the animal, although it leaves it perfectly conscious, but it cannot be considered as a tranquilliser. It is practically without effect up to 0.50 g./kg. in the audiogenic crisis test, only giving a protection of an hour against this type of epilepsy when it is injected in a dose of 0.60 mg./kg. It is slightly sedative in the spinning rod test where, a dose of 0.6 g./kg. administered intraperitoneally to C57 Black mice modifies the reaction of the animal for some hours. In the Courvoisier traction test, at the same dose, the animals return practically to the normal state 30 minutes after the injection. The general effect of these tests is to show a slight, nonhypnotic sedative action.

This compound possesses moreover antifatigue properties. They have been shown by two consecutive tests, known as the swimming test, on 50 C57 Black female mice weight 20 g. For 14 days, 0.3 g./kg. of the product was mixed with their food. The animals were put in a bath and the average time of swimming was calculated for the 50 mice. The same test was repeated 48 hours after the first. Although the control animals give an average of 5 minutes swimming for both consecutive tests, those having received the compound under the conditions indicated swim for an average of 31 minutes on the first test and 20 minutes on the second test. The results of this test thus show up the remarkable psychotonic action of this product.

To sum up, monoethanolamine 3,4,5-trimethoxy-benzohydroxamate may be considered as having little toxicity, it is slightly sedative and possesses a remarkable psychotonic action. The general effect of the tests characterises its central action at different levels; it draws its originality from the fact that, in spite of a certain similarity of action to the antipyretic analgesics and the predominantly cerebral stimulants, it is totally different in its psychoregulator effect.

Although the present specification has referred throughout mainly to monoethanolamine 3,4,5-trimethoxy-benzohydroxamate it is obvious that the remarks apply generally to all compounds of the general formula given above.

We claim:

1. The compound of formula:

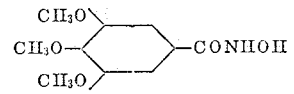

2. The addition product of N-methylaminoethanol and 3,4,5-trimethoxy benzohydroxamic acid having the empirical formula $C_{23}H_{35}N_3O_{11}$, having a melting point on a Marquenne block of 139° C. to 140° C. and on a Culatti block of 130° C.

3. The addition product of monoethanolamine and 3,4,5-trimethoxy benzohydroxamic acid having the empirical formula $C_{22}H_{33}N_3O_{11}$, having a melting point in a capilllary tube of 138–139° C. and a melting point on a Marquenne block of 157° C. and, when recrystallized, having a melting point of 140 to 142° C. in a capillary tube.

References Cited

UNITED STATES PATENTS

| | | | |
|---|---|---|---|
| 2,297,973 | 4/1942 | Dietrich | 260—500 |
| 3,193,456 | 7/1965 | Mauvernay | 260—559 |

LEON ZITVER, *Primary Examiner.*

JULIAN S. LEVITT, *Examiner.*

L. B. RANDALL, J. C. EVANS, *Assistant Examiners.*